Sept. 14, 1954     W. J. GREENE     2,689,332
MAGNETIC GAS ANALYZER
Filed July 14, 1951     3 Sheets-Sheet 1
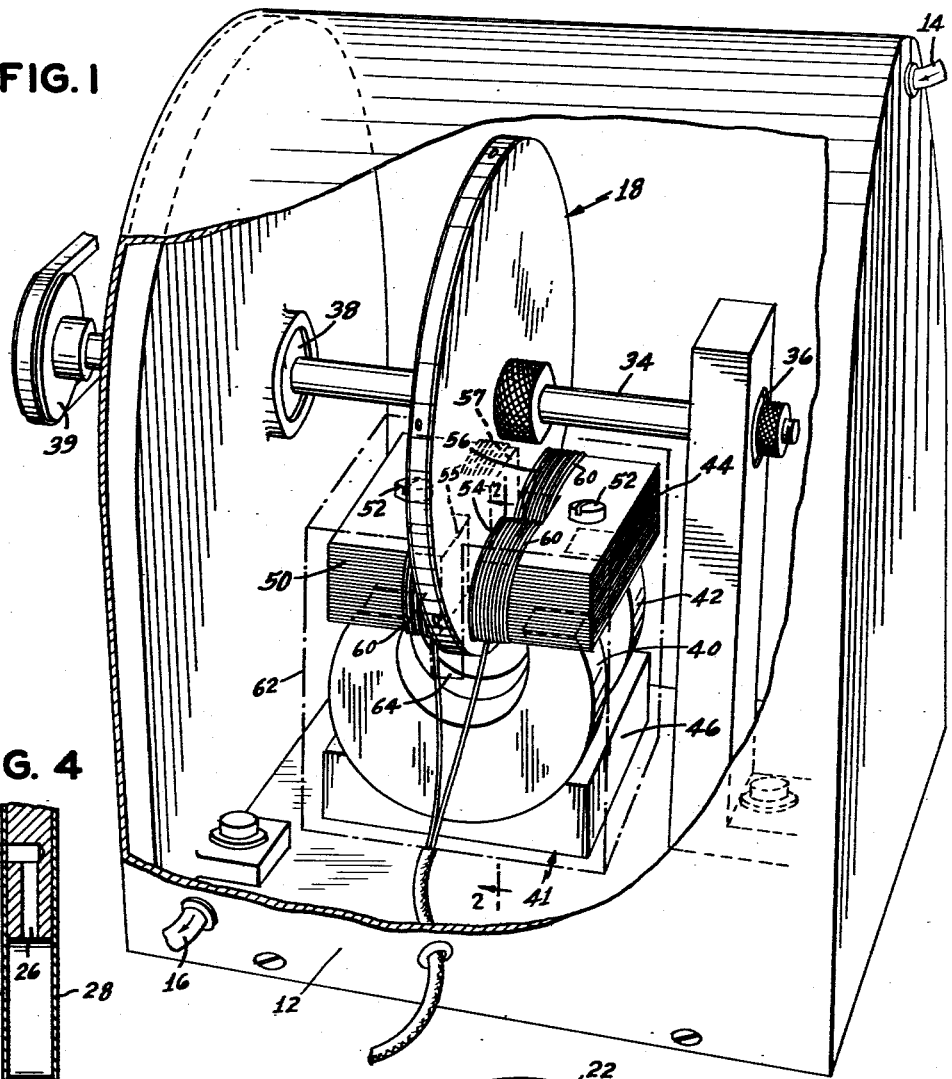
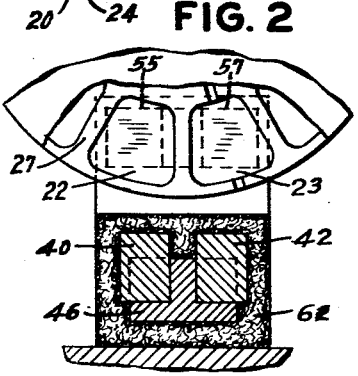
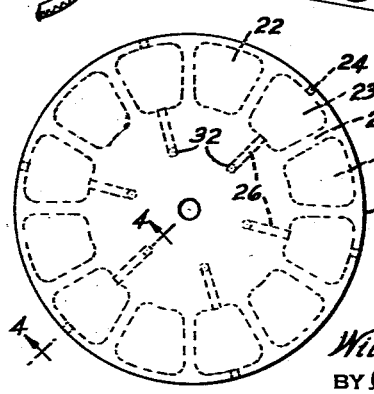
INVENTOR
William J. Greene
BY Pennie, Edmonds,
Morton, Barrows and Taylor
ATTORNEYS Sept. 14, 1954
W. J. GREENE
2,689,332
MAGNETIC GAS ANALYZER
Filed July 14, 1951
3 Sheets-Sheet 2
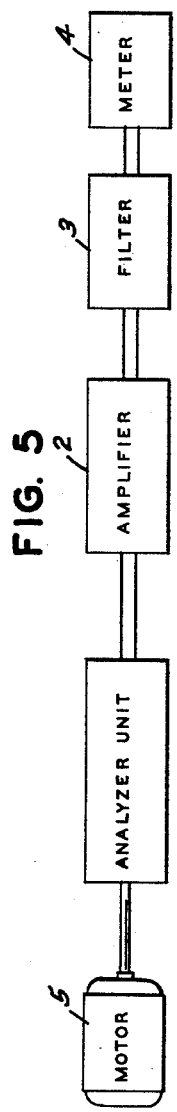
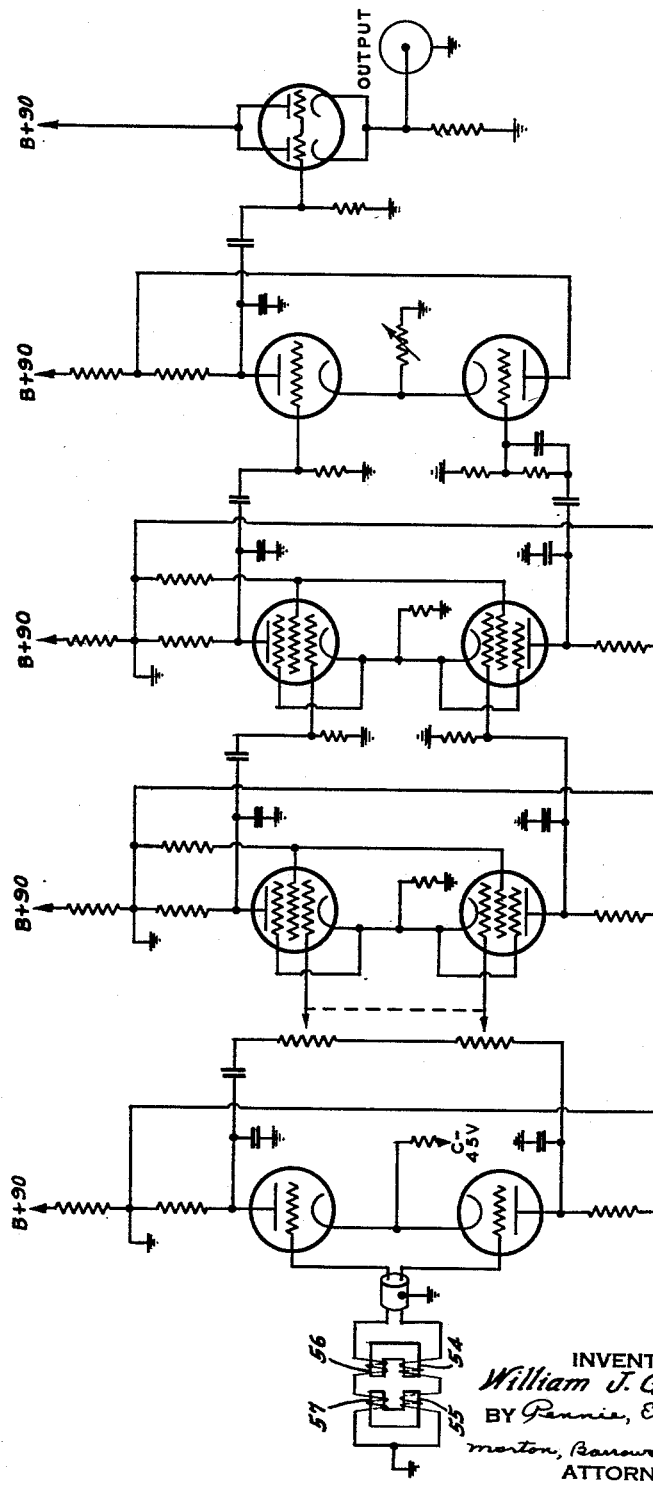
INVENTOR
William J. Greene
BY Pennie, Edmonds,
Morton, Barrows and Taylor
ATTORNEYS Sept. 14, 1954 W. J. GREENE 2,689,332
MAGNETIC GAS ANALYZER
Filed July 14, 1951 3 Sheets-Sheet 3

INVENTOR
William J. Greene
BY Pennie, Edmonds,
Morton, Barrows and Taylor
ATTORNEYS Patented Sept. 14, 1954

2,689,332

UNITED STATES PATENT OFFICE 2,689,332

MAGNETIC GAS ANALYZER

William J. Greene, Scotch Plains, N. J., assignor to Air Reduction Company, Incorporated, New York, N. Y., a corporation of New York Application July 14, 1951, Serial No. 236,793

11 Claims. (Cl. 324—36)

This invention relates to apparatus for determination of the oxygen content of mixed gases by measurement of the permeability of such gases and more particularly to a gas analyzer in which a plurality of cells of the gas under test are passed in alternation with an equal plurality of cells of a reference material through the gaps of an even plurality of pairs of magnetic poles on a magnet. The spacing of the cells and of the pairs of poles and the orientation and connection of coils wound thereon are so ordered as to keep constant the flux supplied by the magnet and to cancel out in the coils voltages induced by stray fields and by vibration of the apparatus, with the result that the voltages appearing at the terminals of the coils are an accurate measure of the concentration of oxygen in the gas under test. This voltage is then amplified to a sutable level for the operation of an indicating device.

Gas analysis according to the invention depends upon the fact that the magnetic susceptibility of oxygen is much greater than that of other gases, with a few exceptions such as nitric oxide, nitrogen dioxide and chlorine dioxide. In the absence of such gases as constituents therefore, the susceptibility of a mixture of gases is substantially proportional to the oxygen concentration in the mixture. The permeability $\mu$ and volume susceptibility $k$ are related by the expression $\mu=1+4\pi k$.

It has been proposed heretofore to measure the permeability of oxygen-containing gases by passing samples of the gas between the pole pieces of a magnet and by measuring the signal induced in a coil wound on the magnet by the changes in flux through the coil caused by changes in reluctance at the gap between the poles as the gas under test and a reference material of unity permeability are successively substituted there.

With a reference material which is magnetically neutral, the voltage induced in the coil is, ideally, proportional to the susceptibility of the gas in the samples, and hence to the oxygen concentration, in view of the negligibly small susceptibilities of other gases by comparison.

Apparatus of this type heretofore developed has not been successful because of the extremely minute size of the voltages which can be induced in a coil by this method. The permeability of oxygen differs from unity by only some two parts in one million, and the percentage change in reluctance of a magnetic circuit including an air gap due to substitution of even 100 per cent oxygen for unity permeability material in the air gap is very small. Accordingly even with very rapid substitutions, the rate of change of flux is not high enough to produce in a coil voltages above the order of microvolts. In view of the magnitude of the voltages to be measured, undesired voltages induced by fluctuating stray fields and by vibration of the coil-supporting apparatus have with the constructions heretofore employed been great enough to mask a signal representative of the difference in permeability between the gas and the reference material. Moreover this signal has been held to low values by the occurrence of eddy currents in the magnet in response to the pulsations of the flux delivered by it.

Thus for example there is shown in U. S. Patent No. 2,467,211 to A. J. Hornfleck a device for gas analysis in which a toothed wheel of magnetically neutral material is rotated to pass its teeth between the poles of a number of pairs of poles coupled to a cylindrical magnet. The gaps are therefore alternately occupied by the atmosphere in which the wheel is run and (in part) by the material of the wheel. The circumferential spacing of the teeth is equal to the circumferential spacing of the pairs of poles so that the flux changes at all gaps in the same phase. To obtain addition of the voltages induced in the coils which are wound on the poles, they must be oriented and connected to add voltages due to simultaneous flux changes of the same sign at the various gaps. The device of the patent is therefore subject to stray fields. In addition, since the flux changes in the same direction at all gaps, the flux delivered by the magnet is a pulsating one, and the resulting eddy currents in the magnet limit the magnitude of the very flux changes upon which the measurement process of the device depends.

The present invention provides a construction in which by proper spacing of an even plurality of pairs of magnetic poles with reference to the spacing of the cells of gas under test and of the reference material, and by suitable connection with the windings, all of these difficulties are largely overcome. The total flux supplied by the magnet is rendered substantially constant, resulting in a high useful signal, and the effects of stray fields and of vibration of the cell-supporting structure are largely balanced out. Meters have been constructed according to the invention having a substantially linear relation between voltage output and oxygen percentage from a few per cent to 100 per cent and with an accuracy of about 1 per cent at 100 per cent concentration.

My invention will now be further described in terms of two preferred embodiments thereof by reference to the accompanying drawings in which:

Fig. 1 is a perspective view, partly broken away, of a gas analyzer according to my invention;

Fig. 2 is a partial sectional view taken on the line 2—2 of Fig. 1;

Fig. 3 is a plan view (at a reduced scale) of the wheel of the analyzer of Fig. 1, showing the cells for reference and test gases;

Fig. 4 is a sectional view taken on the line 4—4 of Fig. 3;

Fig. 5 is a schematic diagram of a complete gas analyzer apparatus according to the invention;

Fig. 6 is a schematic wiring diagram of an amplifier suitable for use with the gas analyzer of the invention;

Figure 7:
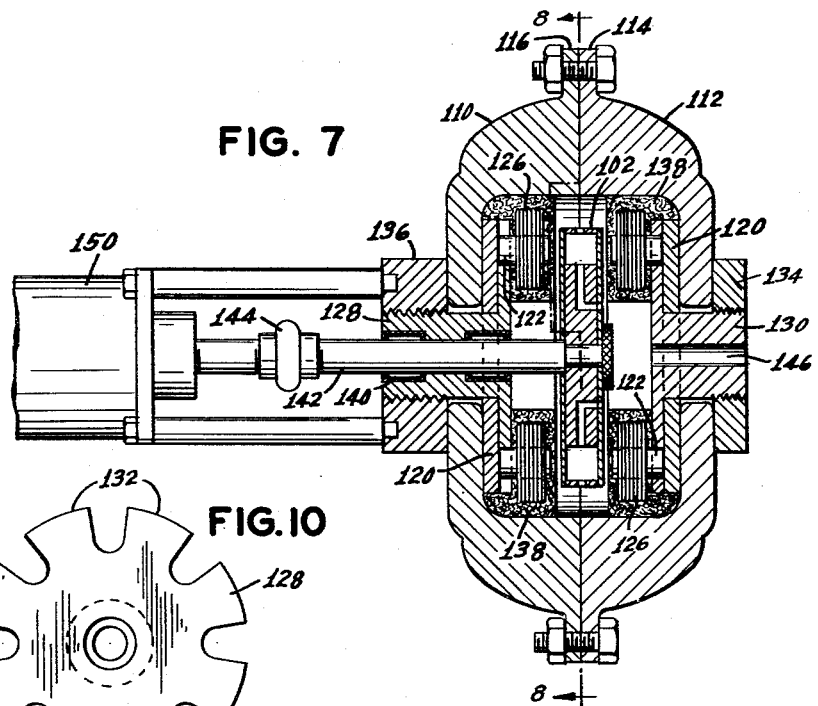
Fig. 7 is a view, partly in axial section, of a modified form of gas analyzer according to my invention.

One embodiment of an analyzer unit according to my invention is shown in perspective in Fig. 1. The analyzer of Fig. 1 includes a substantially gas-tight housing 12 with inlet and outlet connections 14 and 16. Within the housing a gas cell wheel generally indicated at 18 is rotated to pass the cells on its periphery through the gaps of two pairs of pole pieces on a magnet assembly generally indicated at 41.

The wheel is shown in Figs. 3 and 4. It is composed of a disk 20 having an even plurality of holes parallel to its axis formed about its periphery and of two cover plates 28 and 30 cemented to the faces of the disk to form with the holes a plurality of enclosed cells. Half of the cells form totally enclosed voids, whereas alternate cells are connected to the periphery of the wheel by bores 24 in the disk and with one face of the wheel radially inside its periphery by means of additional bores 26 which match with holes 32 in one of the cover plates. Air or any other suitable reference gas of known and preferably low susceptibility is entrapped in the totally enclosed cells while the gas surrounding the wheel is circulated through the bores 26 and 24 communicating with the other cells by centrifugal pumping action when the wheel is rotated. The totally enclosed cells serve as reference gas cells 22, and the open cells serve as test gas cells 23.

By rotation of the wheel the gas in the test cells can be quickly changed, and successive measurements on different gases may be made at intervals of a fraction of a second.

The test and reference cells are preferably of the same size, and are spaced from each other at equal intervals by ribs 27 in the disk.

The wheel 18, including its disk 20 and cover plates 28 and 30 should be made of a material as nearly neutral and homogeneous magnetically as possible. Cellulose nitrate compounds such as Celluloid have a permeability differing from unity by not much more than oxygen itself and are suitable for this purpose. Lack of magnetic homogeneity in the disk and cover plates, due for example to the inclusion of impurities in the material of which they are made, must be balanced out by the application of magnetically active material to the faces of the wheel, as will be subsequently described. In additioon compensation should be made for the reference gas if a gas such as air is used having a substantial concentration of oxygen. Balancing of the wheel to circumferential magnetic homogeneity and compensation of any oxygen present in the reference gas cells are important to reduce the output signal as nearly as possible to zero when the test gas is neutral, i. e. contains no oxygen.

The wheel 18 is mounted on a shaft 34 to turn therewith, and the shaft is supported in bearings as at 36 and 38 to connect with a source of power. A pulley 39 outside the casing 12 may be coupling to a constant speed motor (not shown) by means of a belt, in order to drive the wheel.

A magnetic flux is supplied for measurement of the permeability of the gas by means of a magnet assembly generally indicated at 41. In the embodiment shown two permanent magnets 40 and 42 are supported in a cradle 46. The magnets are arranged with their like poles adjacent to each other, and stacks 44 and 50 of insulated laminations of ferromagnetic material are held in magnetic contact with the magnets by means of screws 52 which pass between the magnets into the cradle 46. The stacks 44 and 50 combine the magnets 40 and 42 effectively into a single magnet or source of flux for two pairs of poles 54, 55 and 56, 57 which are formed on the laminations, which are cut to a U-shape as shown in Fig. 1. The low reluctance paths within the stacks of laminations permit the flux from both magnets to flow through whichever pair of poles has the gap of least reluctance. In the embodiment shown two magnets are employed as a convenient source of the necessary high field. A single magnet of suitable magnetic properties may of course be employed instead.

The two pairs of poles 54, 55 and 56, 57 are spaced from each other by the same distance as are any two adjacent cells 22 and 23 on the wheel 18, so that as shown in Fig. 2, when one cell is centered between the poles of one pair the adjacent cell is centered between the poles of the other pair. Otherwise stated, the gaps of the two pairs of pole pieces are spaced by one-half the interval of two test gas cells on the wheel.

As also shown in Fig. 2 the pole faces on poles 54—57 have each an area comparable in size to the cross sectional area of the test and reference gas cells in the wheel 18. Due to the bulging of the lines of force in the gaps, it is advantageous to give to the pole faces an area slightly smaller than the cross sectional area of the cells in planes perpendicular to the axis of rotation of the wheel.

Each one of the poles carries a coil or a winding 60. The windings on the two poles of each pair are conveniently connected together in series and so oriented as to give aiding voltages when the flux passing between the poles of that pair is changed. The coils of the poles 56, 57 may be oriented similarly or oppositely to those of the poles 54, 55. In either event the four coils are connected together in series so that simultaneous changes of the same sign in the flux across the two gaps will give rise to opposing voltages at the terminals of the four coil series connection. By the same token changes of opposite sign in the fluxes at the two gaps will give rise to voltages which add at the terminals of the four-coil series connection.

In order to minimize unwanted signals due to vibration of the magnets and coils, the complete magnet assembly 41 is potted in a mass of wax or similar material shown in dotted outline as a block 62, in which the slot 64 is milled to accommodate the wheel 18 between the pairs of magnetic poles. While the series connection of coils from the two pairs of pole pieces to add voltages due to flux changes of opposite sign employed in my invention cancels out voltages due to the most prominent mode of vibration of the magnet assembly in which the entire assembly vibrates somewhat as a tuning fork to change the last of the two gaps in phase, the structure can also vibrate torsionally about axes parallel to the faces of the disk to change the lengths of the two gaps out of phase. Use of the mass of potting compound is sufficient to hold this mode of vibration to a negligible level. In the absence of the wheel 18 the flux produced by the magnets divides equally between the two parallel paths formed by the poles on the laminated stacks 44 and 50. With the wheel in place however the total flux will prefer the path of higher permeability. Thus with the wheel 18 in place, if a test gas cell 23 is centered in the gap of one pair of poles, a reference gas cell will be centered in the other, and if the test gas has a greater concentration of oxygen than the reference gas, the flux will favor the poles between which the test gas cell is located, and something more than half of the total flux will pass through the poles between which the test gas cell is located. As the wheel 18 is rotated, the separate fluxes carried by the two pairs of poles will pulsate at a rate determined by the speed of rotation of the disk and by the number of sets of test and reference gas cells in the wheel.

The total flux delivered by the magnets remains substantially constant so that no eddy currents are generated in their yokes. Lamination of the pole pieces and of the structure which joins them to the common source of flux, i. e. to the magnets 40 and 42 proper, minimizes eddy currents in the only part of the magnet assembly subject to flux variations.

The pulsating fluxes at the two gaps each have a fundamental component whose frequency is the quotient of the speed of the disk divided by the number of test gas cells, and these two fundamental components while of the same frequency are 180° out of phase. When the flux at one gap is increasing, that at the other is decreasing and vice versa. By virtue of the connection of the coils 60 above described the voltages corresponding to the fundamental components of the flux variations add together to provide an output signal which while of low amplitude can be amplified to a usable level.

Fig. 5 shows schematically the connection of the analyzer unit to an amplifier, filter and indicator for direct reading of oxygen concentration.

A circuit suitable for the amplifier 2 of Fig. 5 is shown in Fig. 6. Because of the requirement for holding all noise and microphonic signals to the lowest possible level, a tuned amplifier is used, tuned to the fundamental component of the voltage across the series connection of the coils 60. The amplifier of Fig. 6 is of the balanced push-pull type and employs negative feedback in order to improve its stability, upon which correctness of the calibration of the indicating device 4 of Fig. 5 depends. It is advantageous to connect the four coils 60 to the amplifier as shown in Fig. 6, grounding the midpoint of the series connection of four coils. A gain of the order of fifty thousand for the amplifier is sufficient to give a readable signal with a meter of the A. C. rectifier type such as a vacuum tube voltmeter. A filter 3 tuned to the frequency of the fundamental component of the oxygen signal is advantageously inserted after the amplifier to protect the meter or indicating device from interference at other frequencies.

With the wheel turned at a known speed and with given gain settings for the amplifier, the meter may be calibrated to read directly in per cent oxygen. Constant speed of rotation of the wheel and stability for the amplifier are essential to maintenance of such calibration. Accordingly the motor 5 which drives the test cell wheel of the analyzer unit should be of a constant speed type.

Because of the small amplitude of the signal generated by the difference in permeability between the test and reference gases, it is important to eliminate all spurious sources of signal in the analyzer unit itself. For this purpose it is important that the disk be magnetically homogeneous so that with the same gas in the test and reference cells no signal will be generated in the coils due to variations in the permeability of the wheel. The ribs 27 between the reference and test gas cells give rise to a signal component in the coils, but since the flux changes caused thereby are of the same sign at both gaps, the resulting voltages are cancelled out in the series connection of the coils employed. The rib signal is moreover of twice the frequency of the fundamental component of the signal due to susceptibility of the test gas and can be further attenuated by a selective amplification.

As to the remainder of the disk 20 and cover plates however, even carefully selected materials may contain impurities which make uneven the circumferential permeability of the wheel, and the effect of these inclusions should be balanced out. Similarly the effect of oxygen in the reference gas, if any, should be compensated by adding permeability to the test cells to give a zero signal when the unit is run in a magnetically neutral atmosphere.

This balancing and compensation may be accomplished by smearing small quantities of a paramagnetic material such as red oxide of iron at appropriate places on the faces of the wheel. A coating of shellac will then hold this material in place. To effect magnetic balancing it is convenient to connect the output of the amplifier 2 of Fig. 5, without the filter 3, to a cathode-ray oscillograph and to observe the position of the disk by means of a stroboscopic light source.

The oscillograph is set to sweep once for each revolution of the wheel and is connected to the stroboscopic source to be externally synchronized thereby. A card having numbered sectors to correspond to the cells of the wheel is affixed to the driving pulley 39, and a movable pointer is affixed to the housing 12 of the analyzer unit to afford a means of correlating signals on the oscillograph with the portions of the wheel which give rise to them. Some oxide of iron is rubbed over a cell of the wheel at an arbitrary peripheral position, and the light source is adjusted to place the resulting peak at the start of the trace on the oscillograph. The pointer is then set opposite the first-numbered sector on the card as seen in the stroboscopic light. With the oscillograph connected to place the artificial peak upwards, depressions in the trace at other points will indicate sectors on the wheel of less than average permeability, at which iron oxide must be added. If then the phase of the light source and with it the phase of the oscillograph sweep is adjusted to bring a depression to the middle of the trace, the sector of the card seen to be diametrically opposite the pointer will be the sector of the wheel at which oxide must be added. By repeated addition of oxide at appropriate points on the wheel the trace can be made reasonably smooth. This will balance out non-homogeneity of the wheel itself, assuming the operation to be carried out with the test cells filled with the same gas as that contained in the reference cells. If the reference cells contain an oxygen-bearing gas such as air, it will then be necessary to operate the wheel in an oxygen-free atmosphere and to add oxide to the wheel opposite the test gas cells by the same technique in order to eliminate the signal due to oxygen in the reference gas cells.

In the embodiment of Figs. 1-4 the two pairs of pole pieces are spaced by one-half the interval of two test gas cells, i. e. the center-to-center spacing of the two pairs of poles is equal to one-half the center-to-center spacing of two adjacent test gas cells. Of course the pairs of pole pieces may be spaced by a greater distance. It is only necessary that when a test gas cell is centered between the poles of one pair a reference gas cell should be centered between the poles of the other pair. For this purpose the spacing of the pairs of poles should be an odd number of halves of the interval between adjacent test gas cells.

The reference cells need not contain a gas of any sort. They may instead be solid sections of the wheel, provided compensation can be effected for the susceptibility of the wheel, positive or negative, so that the wheel will show a zero signal when run with the test cells filled with a zero per cent oxygen gas. In fact a wheel may be employed consisting of spokes separated by open spaces. The spokes and spaces should both be sector shaped and of approximately the same angular aperture. With a test wheel of this form the magnet assembly should be dimensioned so that when a space is centered in one gap a spoke will be centered in the other. Usually however magnetic balancing is more easily performed on a wheel having continuous cover plates, and it is in fact preferable for ease of compensation that the wheel have gas cells for both test and reference purposes.

Of course other means may be provided to circulate the gas to be tested through the test cells which carry it through the gaps of the magnetic assembly. For example the gas may be fed to the wheel through a hollow shaft and thence to the test cells through radial conduits.

If desired four or any other even number of pairs of poles may be provided on the magnetic assembly, and these may be fed from one or more magnets so long as an even number of pairs of poles are fed by each magnet or single source of magnetic flux employed. When more than two pairs of pole pieces are employed, the coils thereon may be connected all in series or in series parallel combinations. In view of the low signal levels available, it is preferable that all coils should be connected in series. In any arrangement each series connection must include at least two coils from separate pairs of poles which are spaced by an odd number of halves of the interval of two test gas cells on the wheel, and the connection of the terminals of the coils must be established with due regard for the orientation of the coils so as to bring into opposition voltages induced therein at the gaps in question by flux changes of the same sign.

Meters of the type illustrated in Figs. 1-6 have been satisfactorily operated. The output voltage is proportional to susceptibility and hence to oxygen concentration, from a few per cent to 100 per cent. At very low concentrations of oxygen the relation becomes non-linear, and a residual signal is obtained at zero per cent concentration because of the difficulty in effecting complete magnetic balancing. At such low concentrations of oxygen moreover the difficulty of reading various oxygen concentrations from slowly changing voltages is compounded by the fact that the susceptibility due to diluent gases present in heavy concentration may become of the same order of magnitude as the susceptibility due to such small concentrations of oxygen.

Economies in space and reduction in the spurious signal output of the analyzer unit when operating in a magnetically neutral atmosphere may be achieved by increasing the number of pairs of poles so that all cells of the wheel are tested simultaneously. An embodiment of my invention of this type is shown in Figs. 7-10. In this embodiment the cell wheel 102 is of essentially the same construction as the wheel 18 of Fig. 1 except that it contains four test and four reference gas cells instead of six of each. The magnetic structure includes one pair of poles for each cell of the wheel 102. The magnet itself is made in two sections 110 and 112 which may be fastened together at flanges 114 and 116 to form a volume of revolution such as would be generated by the rotation of a horseshoe magnet about an axis parallel to but removed from the magnetic axis of the horseshoe magnet. As in the embodiment of Fig. 1, the salient poles are formed of a material chosen to minimize eddy current losses upon the shift of flux from one pair of poles to the adjacent pair and vice versa. There may be used for this purpose either finely divided iron powder particles insulated from each other or ferrite materials which possess high permeability and at the same time high resistivity.

Figure 9:
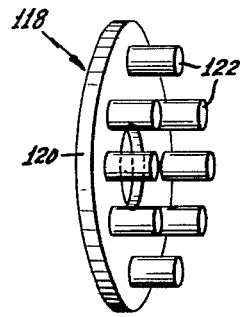
Fig. 9 is a perspective view of one of the pole piece assemblies of the analyzer of Fig. 7.
Figure 8:
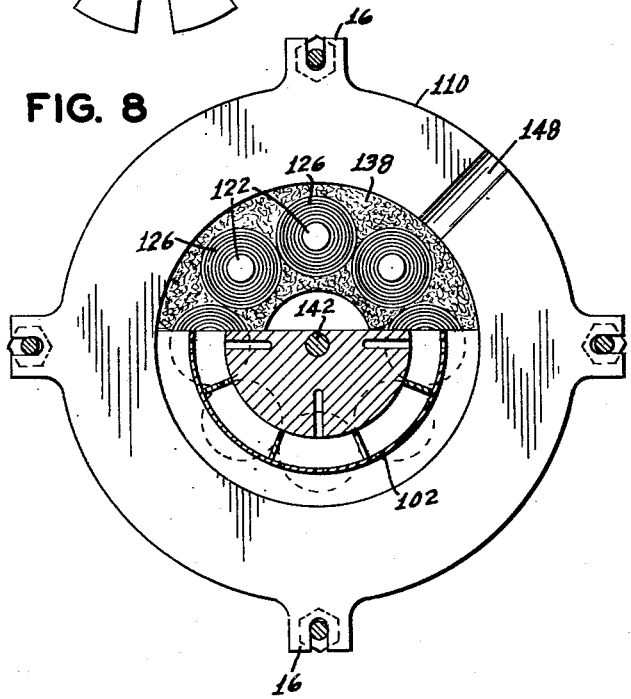
Fig. 8 is a sectional view taken on the line 8—8 of Fig. 7.

Fig. 9 shows a suitable form of pole structure, generally indicated at 118, made of a material having high permeability and low conductivity. Separate assemblies 118 are used for the north and south halves of the magnet, circumferentially located when assembled into the unit of Fig. 7 to line up the poles of each pair. The assembly 118 comprises a ring 120 from which cylindrical poles 122 project, one for each cell of the wheel 102. Each pole carries a winding 126.

Figure 10:
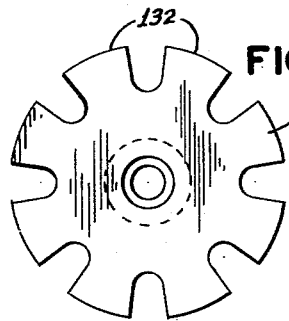
Fig. 10 is a plan view of a retaining spider employed in the analyzer of Fig. 7 to position the pole piece assemblies correctly with respect to the magnet and to effect proper magnetic contact therewith.

The assemblies 118 are retained in magnetic contact with the halves of the magnet itself by means of retaining spiders 128 and 130. The spider 128, seen in plan in Fig. 10, is provided with fingers 132 which project between the poles 122 of the assembly 118. Nuts 134 and 136 permit the spiders to be drawn down over their pole assemblies to assure good magnetic contact with the magnet. As in the embodiment of Fig. 1 it is desirable to minimize vibration of the poles by potting the assemblies 118 with their windings in a wax or similar material formed into a mass 138.

Of course the assemblies 118 may be formed of a plurality of separate parts, each including one or more of the pole pieces 122.

The spider 128 may be provided with bearings at 140 to support the shaft 142 on which the cell wheel 102 is fastened to turn. An inlet conduit 146 for the gas to be tested may be provided in the spider 130, and an outlet conduit 148 (Fig. 8) is formed at the interface of the two halves of the magnet. The shaft 142 connects via a suitable coupling 144 with a motor 150.

For ease of amplification it is desirable to connect all of the coils 126 in series since in this way the maximum voltage is obtained for supply to the input of the amplifier. Of course the criterion described in connection with the embodiment of Fig. 1 for the series connection of coils from circumferentially displaced pairs of poles must be observed in order to obtain additive combination of the desired signals due to flux changes attributable to the difference in susceptibility between the test and reference gases and cancellation of voltages due to stray fields. By stray fields are meant fields originating independently of the magnet assembly used to provide the measuring flux and of such wave lengths that they will appear in substantially the same phase throughout the analyzer.

Both of the embodiments described have been provided with permanent magnets as sources of flux. Of course electromagnets may be used instead, provided the power supplies for their energizing windings are sufficiently well stabilized.

The cell wheels 18 and 102 of Figs. 1 and 7 have been described as being made of material of low permeability. This quality is of practical importance in achieving a wheel which is itself magnetically homogeneous, i. e. free from accidental variations in permeability, and in achieving compensation for any susceptibility of the reference material. Solid materials which are mechanically suitable have in general however susceptibilities of at least the same order of magnitude as oxygen, and such materials are suitable for manufacture of the cell wheels.

In principle indeed the wheels (if provided with cells for a low permeability reference material) might be made of materials of substantial or even ferromagnetic permeability, if they could be manufactured to tolerances sufficiently close to reduce the circumferential variations in permeability which their structure would lend the gaps to proportions negligible compared to the variations produced by the difference in susceptibility between the test gas and reference material. In practice however the difficulties of achieving balance are so great as to make it highly advantageous to use materials having as low a permeability as is consistent with suitable mechanical properties.

The compensation of susceptibility of the reference material has been described herein as desirable because it results in zero output signal for the analyzer when the test gas is of zero susceptibility. This permits the use of a simple type of rectifying indicator responsive simply to the absolute magnitude of the output signal. If however a phase sensitive indicating instrument is employed, together with a suitable reference signal for phase comparison, the compensation may be omitted. Then with air as a reference material for example and a zero per cent oxygen concentration test gas a signal would be obtained equal to that which would be obtained in a compensated unit (or in a unit with an inert reference material) with a 20 per cent oxygen concentration in the test gas. With a test gas of 20 per cent oxygen concentration the signal in the uncompensated unit would be of zero amplitude and with a 40 per cent oxygen concentration test gas the signal would be of the same amplitude as for zero per cent concentration test gas but of the opposite phase. The problem can of course be avoided by using a reference material which has zero susceptibility.

I claim:

1. A gas analyzer comprising a wheel of material of low permeability having a plurality of openings through which a gas may be circulated, said openings being disposed at equal angular intervals about the circumference of the wheel, two pairs of magnetic poles supported in position to receive the openings of the wheel successively in their gaps upon rotation of the wheel, a source of magnetic flux coupled by low reluctance paths to said pairs of poles, said pairs of poles being spaced from each other by an odd number of halves of the interval between adjacent openings of said plurality on the wheel, and a winding on at least one pole of each of said pairs, said windings being connected in series to add voltages induced therein upon changes in flux of opposite sign at said gaps.

2. An oxygen concentration meter comprising a wheel of substantially non-magnetic material, said wheel including a plurality of openings therein open to the atmosphere surrounding the wheel, said openings being disposed at equal intervals about the periphery of the wheel, adjacent openings of said plurality being separated by an interval of substantially the same circumferential dimension as the circumferential dimension of said openings, a magnet, two pairs of poles, the poles of each pair being separated by an air gap, said pairs of poles being connected to the poles of said magnet by magnetic conductors of low reluctance compared to said gaps, said pairs of poles being spaced center-to-center from each other by substantially an odd number of halves of the center-to-center spacing of two adjacent openings of said plurality, a winding on one pole of each of said pairs of poles, said windings being connected in a series circuit to add voltages induced therein upon changes in flux of opposite sign at said gaps, an amplifier coupled to the terminals of said circuit, and an indicating device coupled to the output of the amplifier.

3. A gas permeability measuring device comprising a wheel of substantially magnetically neutral material, a plurality of gas cells formed within said wheel at equal angular intervals about a circle concentric with the wheel, inlet and outlet conduits connecting with each of said cells, means to support the wheel for rotation, a magnet, two pairs of magnetic poles magnetically connected to said magnet, said pairs of poles being spaced from each other by an odd number of halves of the interval between adjacent cells in said wheel, and a coil on one pole of each of said pairs of poles, said coils being connected in series to add voltages induced therein upon changes of flux of opposite sign at the air gaps of their respective pole pairs.

4. A gas permeability measuring device comprising a magnet, two pairs of pole pieces separated by air gaps, said pole pieces being coupled to said magnet through paths of low reluctance, means to pass through said gaps samples of a gas under test and of a reference material of low susceptibility in such succession that when one gap is occupied by a sample of the gas under test the other is occupied by a sample of the reference material and vice versa, and a winding on one pole piece of each of said pairs, said windings being connected in series to add voltages induced therein upon flux changes of opposite sign at the gaps of their respective pairs.

5. In apparatus for gas analysis, a susceptibility measuring device comprising a wheel having an even plurality of voids formed therewithin and disposed at equal angular intervals about a circle concentric therewith, said voids having substantially the same cross section in planes perpendicular to the axis of the wheel, means to pass a gas through alternate ones of said voids, a magnet, an even number of pairs of pole pieces, the pole pieces of each of said pairs being separated by an air gap, ferromagnetic means coupling said pole pieces to said magnet, said pole pieces and coupling means having low conductivity in a direction perpendicular to the flux paths connecting them with said magnet, said pairs of pole pieces being disposed with their gaps on a circle of the same diameter as the circle of said voids, adjacent pairs of said pole pieces having a center-to-center spacing from each other substantially equal to the center-to-center spacing of adjacent voids on said wheel, a winding on a pole piece of each of said pairs, said windings being connected together with respect to their sense so as to connect in series at least two windings on pole pieces of pairs separated by an even number of pole pairs, including zero, to provide additive combination of voltages induced in such series-connected windings by flux changes of opposite sign at the gaps of their respective pairs.

6. A gas analyzer comprising a wheel, an even numbered plurality of cells enclosed in said wheel disposed in a circular array concentric therewith, alternate ones of said cells having each two passages communicating with the exterior surface of the wheel at unequal radial distances from its center, a magnet, north and south pole assemblies of ferromagnetic material, each of said assemblies including in a circular array salient poles in the same number as the number of cells in said wheel, means to couple each of said salient poles through low reluctance paths to a pole of said magnet with said assemblies in coaxial relation to form a pair of poles for each of said cells, said salient poles and coupling means having low conductivity in a direction perpendicular to the flux paths joining said salient poles with said magnet, and a winding on one pole of each of said pairs of salient poles, said windings being connected to place in series at least two windings from pairs of poles circumferentially displaced from each other by a non odd number of said pairs of salient poles with such connection of the terminals of said windings as to add voltages induced in said windings upon changes in flux of opposite sign at the gaps of their respective pole pairs.

7. A gas analyzer comprising a wheel of substantially magnetically neutral material having an even number of voids disposed within its volume in a circular array, alternate voids communicating each to the exterior of the wheel through two ports of unequal radial distance from the center of the wheel, a magnet having its magnetic axis disposed transverse to the plane of the wheel, an even number of pairs of pole pieces connected by paths of low reluctance to the poles of the magnet, pole pieces of like polarity on adjacent pairs being spaced apart by the circumferential spacing of adjacent voids on the wheel, means to support the wheel for rotation in position to pass its voids through the gaps of said pairs of pole pieces, and a coil on one pole piece of each of said pairs, said coils being connected to give additive voltages when the flux through the air gaps of adjacent pairs of pole pieces changes in opposite senses.

8. In a gas analyzer, a test gas and reference gas cell wheel formed of material of low permeability, said wheel having an even plurality of cells of substantially equal volume and area in planes perpendicular to the axis of the disk disposed within the wheel at equal angular intervals about its periphery, alternate ones of said cells having each two openings to the exterior of the wheel.

9. The method of determining the oxygen concentration of a gas which comprises rapidly alternately inserting in opposite order into the gaps of two pairs of pole pieces fed from a common source of magnetic flux samples of the gas under test and of a reference material of known susceptibility, and measuring the sum of the voltages induced in two windings one of which is wound on a pole piece of one of said pairs of pole pieces and the other of which is wound on a pole piece of the other of said pairs of pole pieces.

10. The method of determining the oxygen concentration of a mixed gas which comprises rapidly substituting in the gaps between two pairs of magnetic poles fed from a common source of flux samples of the gas under test and of a reference material of known susceptibility such that while one gap is occupied by a sample of the gas under test the other is occupied by a sample of the reference material and vice versa, and measuring the sum of the voltages induced in two windings one of which is traversed by the flux passing through one of said gaps and the other of which is traversed by the flux passing through the other of said gaps.

11. An oxygen concentration meter comprising a wheel having a plurality of openings disposed at equal angular intervals about its circumference, two pairs of magnetic poles supported in position to receive the openings of the wheel successively between their gaps upon rotation of the wheel, said pairs of poles being spaced center-to-center from each other substantially by an odd number of halves of the center-to-center spacing of adjacent openings on the wheel, means to supply magnetic flux to each of said pairs of poles, and separate windings linking the fluxes fed to each of said pairs of poles, said windings being connected in series to add voltages induced therein upon flux changes of opposite sign at said gaps.

References Cited in the file of this patent

UNITED STATES PATENTS

| Number | Name | Date |
|---|---|---|
| 2,416,344 | Pauling | Feb. 25, 1947 |
| 2,467,211 | Hornfeck | Apr. 12, 1949 |
| 2,476,304 | Kells et al. | July 19, 1949 |